United States Patent
Li et al.

(10) Patent No.: US 11,796,211 B2
(45) Date of Patent: Oct. 24, 2023

(54) CONSTANT TEMPERATURE AIR CIRCULATION SYSTEM

(71) Applicant: Wuhan Micro-Environment Control Technology Co., Ltd., Hubei (CN)

(72) Inventors: Xiaoping Li, Hubei (CN); Di Cao, Hubei (CN); Jianhui Wang, Hubei (CN); Jinchun Wang, Hubei (CN)

(73) Assignee: Wuhan Micro-Environment Control Technology Co., Ltd., Hubei (CN)

( * ) Notice: Subject to any disclaimer, the term of this patent is extended or adjusted under 35 U.S.C. 154(b) by 182 days.

(21) Appl. No.: 17/344,993

(22) Filed: Jun. 11, 2021

(65) Prior Publication Data
US 2022/0099327 A1   Mar. 31, 2022

(30) Foreign Application Priority Data

Sep. 27, 2020   (CN) .......................... 202011033941.7

(51) Int. Cl.
| | |
|---|---|
| F24F 11/81 | (2018.01) |
| F24F 11/77 | (2018.01) |
| F24F 1/0323 | (2019.01) |
| F24F 1/022 | (2019.01) |
| F24F 13/30 | (2006.01) |
| F24F 110/30 | (2018.01) |
| F24F 110/10 | (2018.01) |
| F24F 1/028 | (2019.01) |
| F24F 11/00 | (2018.01) |

(52) U.S. Cl.
CPC .............. *F24F 11/00* (2013.01); *F24F 1/022* (2013.01); *F24F 1/0323* (2019.02); *F24F 11/77* (2018.01); *F24F 13/30* (2013.01); *F24F 1/028* (2019.02); *F24F 2110/10* (2018.01); *F24F 2110/30* (2018.01); *F24F 2221/54* (2013.01)

(58) Field of Classification Search
CPC .......... F24F 11/81; F24F 1/022; F24F 1/0323; F24F 11/77; F24F 13/30; F24F 1/028; F24F 2110/10; F24F 2110/30; F24F 2221/54; F24F 13/08; F24F 11/74; Y02B 30/70; F25B 29/003; F25B 49/02; B01L 1/00

See application file for complete search history.

(56) References Cited

FOREIGN PATENT DOCUMENTS

| | | |
|---|---|---|
| CN | 107450637 | 12/2017 |
| CN | 111013671 | 4/2020 |
| CN | 210624821 U | * 5/2020 |

* cited by examiner

*Primary Examiner* — Nelson J Nieves
*Assistant Examiner* — Matthew John Moscola
(74) *Attorney, Agent, or Firm* — JCIP GLOBAL INC.

(57) ABSTRACT

A constant temperature air circulation system is provided. Air valves are installed behind two three-way nodes of a main circulation loop and parallel bypasses to adjust a flowing amount of gas of each branch. When a compressor keeps a current state unchanged, a draught fan and air valves do not change. When the compressor needs to be turned on and then to be turned off, an air volume of the draught fan is adjusted, and the flowing amounts of the bypasses and a main circuit are simultaneously adjusted until the air valves that control a flowing amount of an evaporator are all closed and the air valves of the bypasses are all opened. Adjustment of the air valves and state switching of the compressor are made at the same time, so that the flowing amount flowing through a heater to a chamber is ensured to always remain unchanged.

12 Claims, 5 Drawing Sheets

CONSTANT TEMPERATURE AIR CIRCULATION SYSTEM

CROSS-REFERENCE TO RELATED APPLICATION

This application claims the priority benefit of China application serial no. 202011033941.7, filed on Sep. 27, 2020. The entirety of the above-mentioned patent application is hereby incorporated by reference herein and made a part of this specification.

BACKGROUND

Technical Field

The disclosure relates to a field of constant temperature air circulation systems, and in particular, to a constant temperature air circulation system.

Description of Related Art

Micro-environment purification apparatuses are mostly used to provide a constant temperature, constant humidity, and clean environment for semiconductor manufacturing equipment and precision measuring equipment. In the related art, most of the micro-environment apparatuses and purification rooms use air-conditioning units formed by compressors, evaporators, condensers, and expansion valves for temperature control. Further, a temperature control system based on the control of heaters embedded in series with the air conditioning unit is also provided as an improvement. Nevertheless, the related arts have not been able to achieve: under certain working conditions, the compressor can be turned off while cooling and energy saving can also ensure temperature stability, and deal with the impact of compressor state switching on the temperature control of the target position.

Patent CN107450637A discloses a high cleanliness purification room capable of precise temperature and humidity control and provided with a purification room which is composed of wall boards, a top board, and a double door. The wall boards, the top board, and the double door are all assembled by steel rock wool thermal insulation sandwich panels. A telescopic sealing rubber strip is mounted on the lower side of the double door. A temperature adjustment device and a humidity adjustment device are arranged in the purification room. The temperature adjustment device and the humidity adjustment device are connected with a main control device together. The main control device is connected with temperature sensors and humidity sensors through a wireless network. The temperature sensors and the humidity sensors are uniformly arranged in the purification room. In the solution provided by the patent, temperature control is performed only through a single heater, so that air cooling may not be performed, and the adjustment range is small. Moreover, in the case that a single actuator is used for control, accuracy may be lower than that performed by multi-level control.

Patent CN111013671A discloses a dynamic heat balance constant temperature and humidity control device and a control method. In the invention, a compressor unit is used for cooling, and an electric heater is used for forcing the temperature in the box to rise slowly. The system controls the hot airflow according to calculation to force the refrigerating system to increase the refrigerating capacity so as to balance the heat output by electric heating. The air in the box is guided to the evaporator by the circulating fan, and the humidity is reduced by condensing the moisture in the air while temperature is kept constant. When the relative humidity in the box reaches the setting point, the output of electric heating and the output of humidification are in a constant output state. In the solution provided by the patent, the compressor and heater are kept working under all working conditions, and no independent air supplementation device is used. Further, when the air temperature of air before circulating to the evaporator is lower than the setting point, no feasible energy saving solution is designed.

SUMMARY

In view of the shortcomings of the related art, the disclosure aims to provide a constant temperature air circulation system to solve the problems that an existing constant temperature air apparatus cannot be cooled, has a small adjustment range, or can be cooled and heated but cannot achieve energy saving.

To accomplish the above purpose, the disclosure provides a constant temperature air circulation system including a gas supplementing device, a draught fan, a cooling and heat exchanging device, a heating device, a constant temperature chamber, and a draught fan state switching device.

The constant temperature chamber is not sealed, and the gas supplementing device supplements gas to compensate for gas leaking from the constant temperature chamber. The draught fan provides power for air to circulate among the gas supplementing device, the cooling and heat exchanging device, the heating device, the constant temperature chamber, and the draught fan state switching device. The cooling and heat exchanging device cools the circulating air. The heating device heats the circulating air, such that a temperature of the air circulating in the constant temperature chamber is stably maintained at a predetermined temperature value.

When detecting that a temperature of the gas supplemented by the gas supplementing device is continuously lower than a temperature threshold, the draught fan state switching device is configured to gradually allow the air processed by the cooling and heat exchanging device to flow out without passing through the constant temperature chamber, to gradually increase an air volume of the draught fan and allow part of the air volume of the draught fan to flow through the constant temperature chamber without passing through the cooling and heat exchanging device to ensure that an flowing amount of air flowing through the constant temperature chamber remains stable, and to gradually turn off the cooling and heat exchanging device to stop cooling the circulating air.

When detecting that the temperature of the gas supplemented by the gas supplementing device is continuously greater than or equal to the temperature threshold, the draught fan state switching device is further configured to gradually turn on the cooling and heat exchanging device, to gradually turn off a bypass allowing the air processed by the cooling and heat exchanging device to flow out without passing through the constant temperature chamber, and to gradually turn off a bypass allowing part of the air volume of the draught fan to flow through the constant temperature chamber without passing through the cooling and heat exchanging device to turn on the cooling and heat exchanging device for cooling the circulating air. The draught fan state switching device is configured to assist in switching a working state of the cooling and heat exchanging device to save energy in the constant temperature air circulation system and to ensure that the working state of the cooling and heat exchanging device is switched without affecting a flowing amount and temperature of the gas flowing through the constant temperature chamber.

In an optional embodiment, the gas supplementing device includes a gas inlet, a gas supplementation opening, and a gas outlet. The gas inlet of the gas supplementing device is connected to a gas outlet of the constant temperature chamber, and the gas outlet of the gas supplementing device is connected to a gas inlet of the draught fan. Air supplemented from the gas supplementation opening of the gas supplementing device and air entered from the gas inlet of the gas supplementing device flow out from the gas outlet of the gas supplementing device together. A gas outlet of the draught fan is connected to a gas inlet of the cooling and heat exchanging device. A gas outlet of the cooling and heat exchanging device is connected to a gas inlet of the heating device. A gas outlet of the heating device is connected to a gas inlet of the constant temperature chamber.

In an optional embodiment, the draught fan state switching device includes a first bypass and a second bypass. A gas inlet of the first bypass is connected to the gas outlet of the cooling and heat exchanging device, and a gas outlet of the first bypass is connected to the gas inlet of the gas supplementing device. A gas inlet of the second bypass is connected to the gas outlet of the draught fan, and a gas outlet of the second bypass is connected to the gas inlet of the heating device.

In an optional embodiment, when a temperature of the air entering from the gas supplementation opening of the gas supplementing device is detected to be continuously lower than the predetermined temperature threshold, the cooling and heat exchanging device is gradually turned off. The air volume of the draught fan is gradually increased, the first bypass and the second bypass are gradually turned on, and an flowing amount of air flowing through the cooling and heat exchanging device is gradually decreased, such that part of gas processed by the cooling and heat exchanging device gradually flows out from the first bypass without passing through the constant temperature chamber, and such that the increased air volume of the draught fan flows into the heating device from the second bypass to compensate a flowing amount of the gas flowing out of the first bypass, to keep the air volume in the constant temperature chamber stable.

When the second bypass is completely turned on, power of a compressor of the cooling and heat exchanging device is gradually decreased, and the air volume of the draught fan is gradually decreased until the cooling and heat exchanging device stops working.

In an optional embodiment, when a temperature of the air entering from the gas supplementation opening of the gas supplementing device is detected to be continuously greater than or equal to the predetermined temperature threshold, the air volume of the draught fan is gradually increased, the cooling and heat exchanging device is gradually turned on, a flowing amount of air flowing to the cooling and heat exchanging device from the draught fan is gradually increased, and a flowing amount of air flowing to the heating device from the cooling and heat exchanging device is gradually increased.

When the cooling and heat exchanging device is completely turned on, the air volume of the draught fan is decreased, and the first bypass and the second bypass are gradually turned off.

In an optional embodiment, the constant temperature air circulation system further includes: a first wind speed sensor, a third air valve, and a fourth wind speed sensor.

The cooling and heat exchanging device includes: a first air valve, a third wind speed sensor, an evaporator, the compressor, a condenser, and an expansion valve.

The first bypass includes a fourth air valve and a fifth wind speed sensor.

The second bypass comprises a second air valve and a second wind speed sensor.

In an optional embodiment, one end of the first wind speed sensor is connected to the gas outlet of the draught fan. Another end of the first wind speed sensor is connected to one end of the first air valve and one end of the second air valve. Another end of the first air valve is connected to one end of the third wind speed sensor. Another end of the third wind speed sensor is connected to a first end of the evaporator. A second end of the evaporator is connected to one end of the third air valve and one end of the fourth air valve. Another end of the third air valve is connected to one end of the fourth wind speed sensor, and another end of the fourth wind speed sensor is connected to the heating device. One end of the first air valve acts as the gas inlet of the cooling and heat exchanging device, and the second end of the evaporator acts as the gas outlet of the cooling and heat exchanging device.

A gas inlet of the compressor is connected to a third end of the evaporator, and a gas outlet of the compressor is connected to a gas inlet of the condenser. A gas outlet of the condenser is connected to one end of the expansion valve, and another other end of the expansion valve is connected to a fourth end of the evaporator.

Another end of the second air valve is connected to one end of the second wind speed sensor, and another end of the second wind speed sensor is connected to another end of the fourth wind speed sensor.

Another end of the fourth air valve is connected to one end of the fifth wind speed sensor, and another end of the fifth wind speed sensor is connected to the gas inlet of the gas supplementing device.

The first wind speed sensor is configured to detect the air volume flowing out from the gas outlet of the draught fan. The second wind speed sensor is configured to detect an air volume of the second bypass. The third wind speed sensor is configured to detect an air volume flowing into the evaporator. The fourth wind speed sensor is configured to detect an air volume of air flowing to the heating device from the evaporator. The fifth wind speed sensor is configured to detect an air volume of the first bypass.

In an optional embodiment, gradually turning off the cooling and heat exchanging device is specifically implemented as follows.

The air volume of the draught fan is gradually increased, the second air valve and the fourth air valve are gradually opened together, and the air volume of the draught fan is gradually decreased and the first air valve and the third air valve are gradually closed together when the second air valve is completely opened. Opening rates of the second air valve and the fourth air valve and closing rates of the first air valve and the third air valve are determined based on air volumes detected by the first wind speed sensor, the second wind speed sensor, the third wind speed sensor, the fourth wind speed sensor, and the fifth wind speed sensor. An increase amount of the air volume of the draught fan is equal to the air volume detected by the fifth wind speed sensor to ensure that the working state of the cooling and heat exchanging device is switched without affecting the flowing amount and temperature of the gas flowing through the constant temperature chamber.

In an optional embodiment, gradually turning on the cooling and heat exchanging device is specifically implemented as follows.

The air volume of the draught fan is gradually increased, the first air valve and the third air valve are gradually opened together, and the air volume of the draught fan is gradually decreased and the second air valve and the fourth air valve are gradually closed together when the first air valve is completely opened. Closing rates of the second air valve and the fourth air valve and opening rates of the first air valve and the third air valve are determined based on the air volumes detected by the first wind speed sensor, the second wind speed sensor, the third wind speed sensor, the fourth wind speed sensor, and the fifth wind speed sensor. A decrease amount of the air volume of the draught fan is equal to the air volume detected by the fifth wind speed sensor to ensure that the working state of the cooling and heat exchanging device is switched without affecting the flowing amount and temperature of the gas flowing through the constant temperature chamber.

In general, the above technical solutions provided by the disclosure have the following beneficial effects compared with the related art.

The disclosure provides a constant temperature air circulation system. On the basis of the main circulation loop, two parallel gas bypasses are designed. The first bypass treats any position between the inlet of the evaporator and the outlet of the draught fan as the input end and treats any position between the outlet of the evaporator and the heater as the output end. The second bypass treats any position between the outlet of the evaporator and the outlet of the first bypass as the input end and treats any position that is connected to the outlet of the chamber as the output end. In the disclosure, air valves are installed behind the two three-way nodes of the main circulation loop and the parallel bypasses to adjust the flowing amount of gas of each branch. When the compressor keeps the current state unchanged, the draught fan and air valves do not change. When the compressor needs to be turned on and then to be turned off, the air volume of the draught fan is adjusted, and the flowing amounts of the bypasses and the main circuit are simultaneously adjusted until the air valves that control the flowing amount of the evaporator are all closed and the air valves of the bypasses are all opened. When the compressor needs to be turned off and then to be turned on, the air volume of the draught fan is adjusted, and the flowing amounts of the bypasses and the main circuit are simultaneously adjusted until the air valves that control the flowing amount of the evaporator are all opened and the air valves of the bypasses are all closed. Adjustment of the air valves and state switching of the compressor are made at the same time, so that the flowing amount flowing through the heater to the chamber is ensured to always remain unchanged.

The disclosure provides a constant temperature air circulation system and provides an energy saving mechanism in which the working state of the compressor is adjusted through determining whether the relationship between the temperature of the supplemented air and the target temperature of the constant temperature chamber satisfies a predetermined condition. The determination logic is: the continuous sampled data is filtered, and the moving average is combined with the window scale for filtering. When the filtered temperature is lower than the threshold, the compressor is turned off, and when the filtered temperature is greater than the threshold, the compressor is turned on to achieve the purpose of long-term operation and energy saving. The window scale of the moving average filter and the solution of the determination threshold are related to the physical characteristics of the system and are determined by prior experiments.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure.

A constant temperature air circulation system of the disclosure provides a long-term, stable, and energy-saving solution based on multi-stage temperature control, through which a state of a compressor may be adaptively switched according to a fresh air temperature. Two important circuits are designed to bypass gas flowing through the compressor and through a chamber. Through adjustment of an openness degree of a draught fan and air valves, a flowing amount when the state of the compressor is switched is adjusted, such that a temperature of the chamber is prevented from being interfered.

Figure 1:
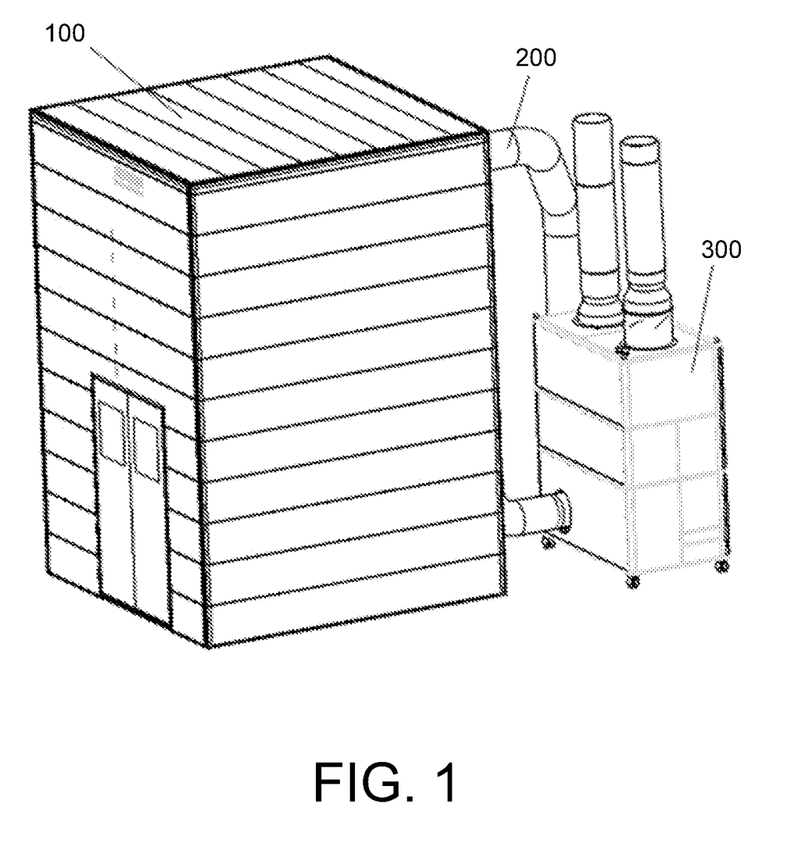
FIG. 1 is a schematic view of a structure of a constant temperature air circulation system according to an embodiment of the disclosure.

As shown in FIG. 1, a constant temperature air circulation system is formed by a temperature control cabinet 300, a constant temperature chamber 100, and a circulation pipeline 200. The temperature control cabinet 300 is provided with a gas supplementing device, a draught fan, a cooling and heat exchanging device, a heating device, and a draught fan state switching device. The constant temperature chamber 100 is connected to every device in the temperature control cabinet 300. The gas supplementing device includes a gas inlet, a gas supplementation opening, and a gas outlet. The gas inlet of the gas supplementing device is connected to a gas outlet of the constant temperature chamber 100, and the gas outlet of the gas supplementing device is connected to a gas inlet of the draught fan. Air supplemented from the gas supplementation opening of the gas supplementing device and air entered from the gas inlet of the gas supplementing device flow out from the gas outlet of the gas supplementing device together. A gas outlet of the draught fan is connected to a gas inlet of the cooling and heat exchanging device. A gas outlet of the cooling and heat exchanging device is connected to a gas inlet of the heating device. A gas outlet of the heating device is connected to a gas inlet of the constant temperature chamber 100.

The constant temperature chamber 100 is not sealed, and the gas supplementing device supplements gas to compensate for gas leaking from the constant temperature chamber 100. A precision measuring apparatus may be placed in the constant temperature chamber 100 for the precision measuring apparatus to work in a constant temperature environment.

The circulation pipeline 200 is configured to connect the constant temperature chamber 100 and the temperature control cabinet 300.

Figure 2:
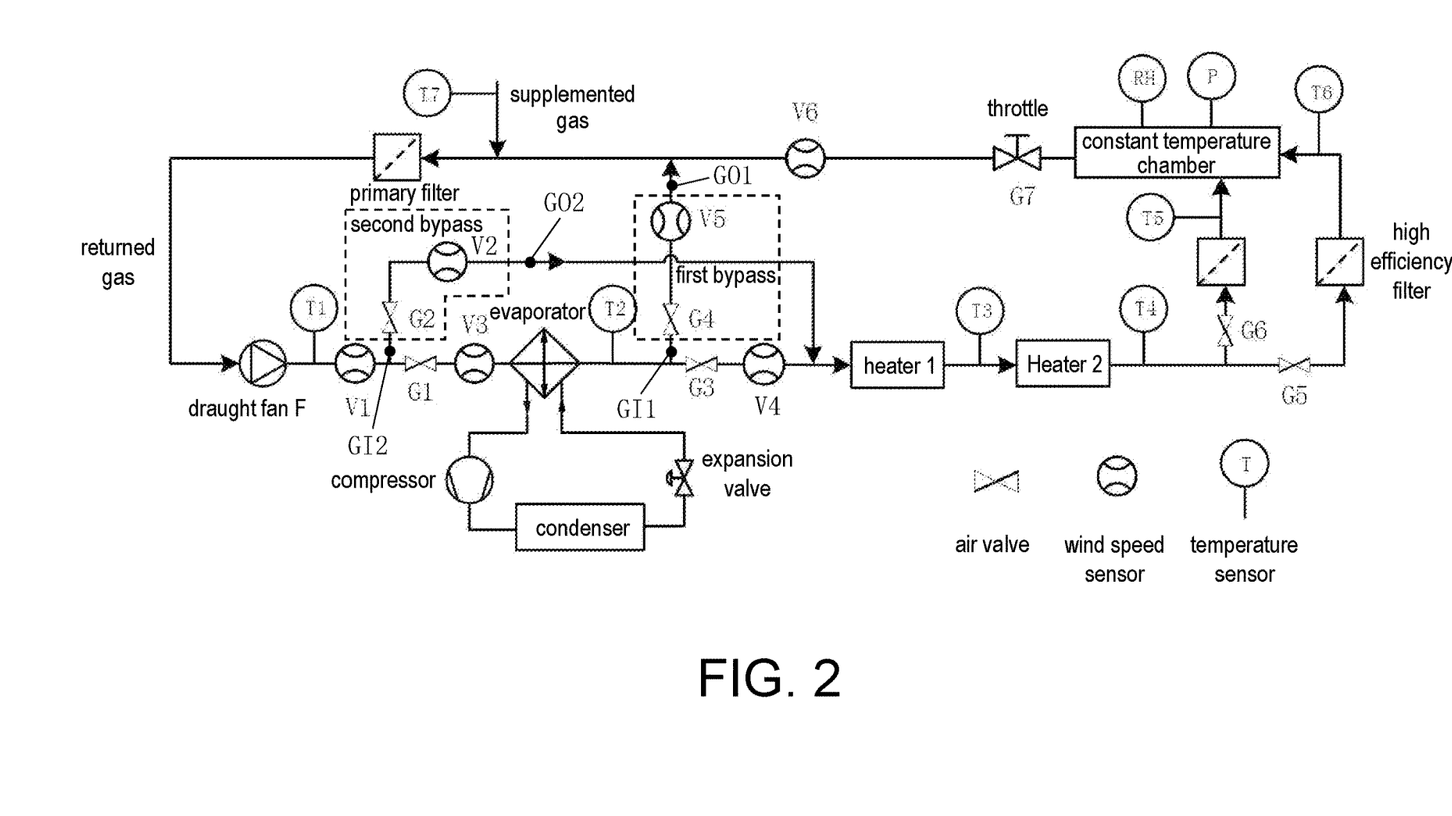
FIG. 2 is a schematic diagram of a process solution of the constant temperature air circulation system according to an embodiment of the disclosure.

As shown in FIG. 2, in a process solution of the constant temperature air circulation system, a cooling and heat exchanging system formed by a compressor, a condenser, an expansion valve, an evaporator is included. Further, a heater 1 and a heater 2 configured for heating air, a humidity sensor and a pressure sensor configured for feeding back a physical state of a chamber, a sensor configured for feeding back and temperature detection in an entire circulation loop, a draught fan F configured for flowing amount adjustment, as well as an air valve and a flow meter in each pipeline are also included. In addition, a filter for gas filtration and a throttle for turning off the circulation are also included.

In a circulation air system, the draught fan F is used to provide a pressure required for air circulation, a rotating speed may be adjusted by adjusting a working frequency, and a flowing amount of circulating air may be accordingly adjusted. Two key bypasses are designed to adjust a gas flowing amount when the state of the compressor is switched. A bypass 1 is disposed in front of the evaporator and is directly connected to the front of the heater. Air flowing out from the draught fan is adjusted through air valves G1 and G2 to adjust flowing amounts flowing through the evaporator and the bypass. Further, another bypass 2 is designed at an outlet of the evaporator to be directly connected to an outlet of the constant temperature chamber, and an inlet GI2 of the bypass 2 is designed behind an outlet GO1 of the bypass 1. Flowing amounts of gas flowing to the constant temperature chamber and the bypass are adjusted respectively through G3 and G4. Air cooled by the evaporator is subjected to first-level temperature control at the heater 1 and second-level temperature control at the heater 2, with T3 and T4/T6 as control feedback points, respectively. The gas flowing out of the chamber may circulate back to an inlet of the draught fan, and fresh air acting as supplementing air also flows in at the same time.

Figure 3:
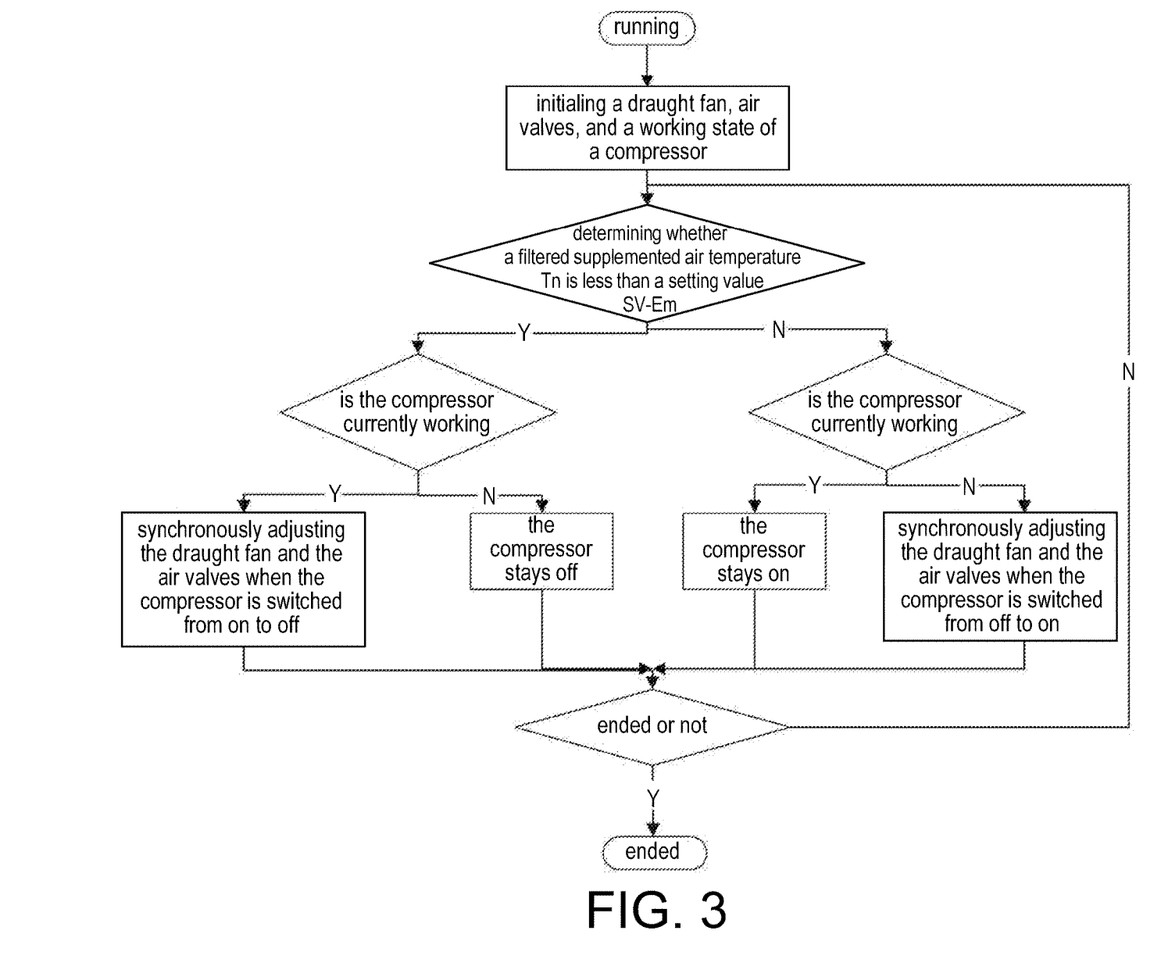
FIG. 3 is a schematic total flow chart of working state switching of a compressor according to an embodiment of the disclosure.

The following is provided as illustrated in FIG. 3.

In a main flow chart illustrating state switching of the draught fan, logic for switching determination is included. At the beginning, the draught fan, the air valves, and the state of the compressor are initialized. When initialization is performed, the compressor is turned on, the air valves G1/G3 are fully opened, and the air valves G2/G4 are closed. After the system is stabilized for a period of time, a continuously-sampled fresh air temperature is filtered, and Tm is used as a window size of a moving average filter. According to a difference between filtered data and a temperature setting value of the chamber and a current working state of the compressor, it is determined whether switching is performed. Four situations are available in total. When the filtered data is less than SV−Em, SV is the temperature setting value of the constant temperature chamber, and SV−Em is a temperature threshold for switching the working state of the compressor. When the compressor is on, an operation C1 is performed, the compressor is switched from on to off, and the draught fan and air valves are synchronously adjusted. When the filtered data is less than the setting value −Em and the compressor is off, an operation C2 is performed to keep the compressor in the off state. When the filtered data is greater than the setting value −Em and the compressor is off, an operation C3 is performed, the compressor is switched from off to on, and the draught fan and air valves are synchronously adjusted. When the compressor is on, an operation C4 is performed: to keep the compressor in the on state.

Figure 4:
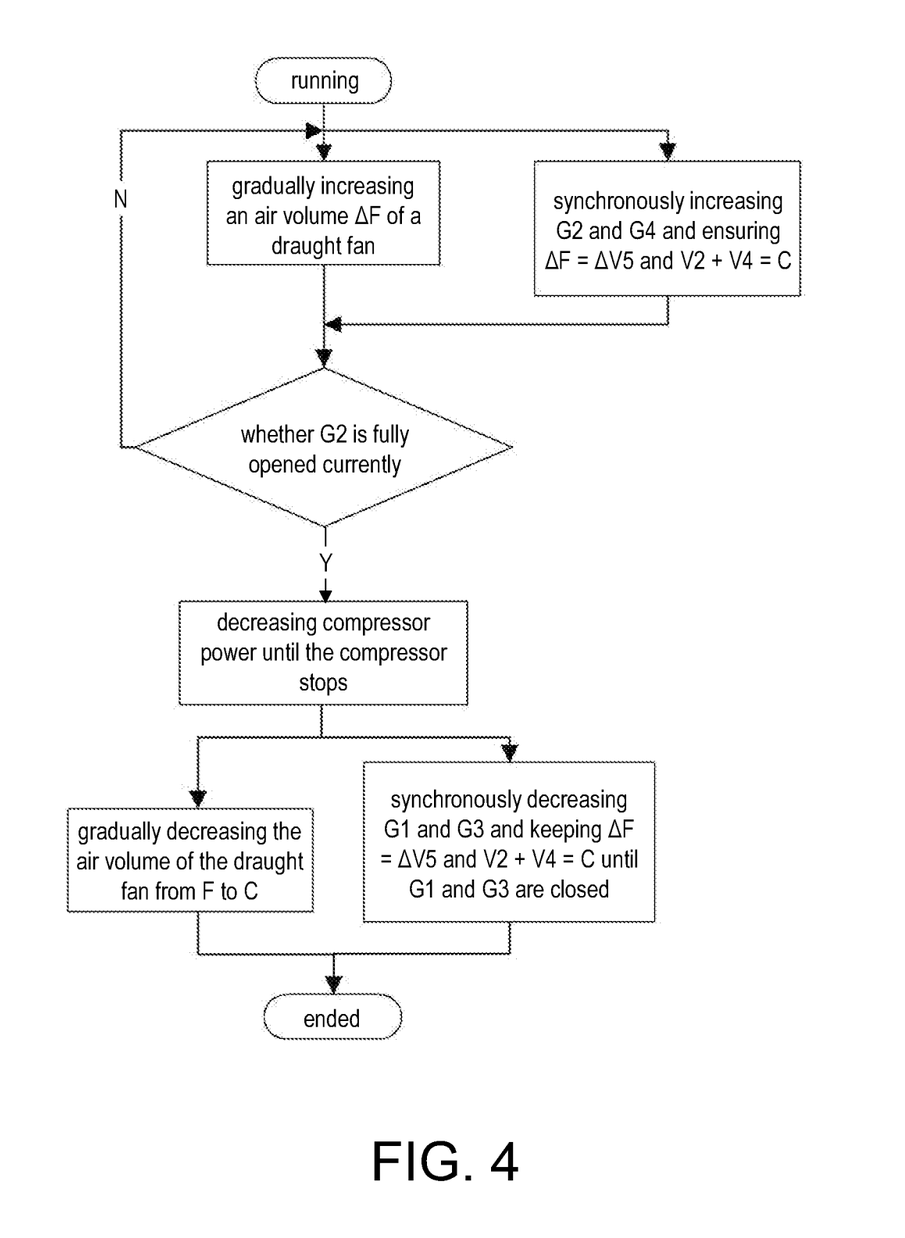
FIG. 4 is a schematic flow chart of operation from turning on the compressor to turning off a draught fan and air valves according to an embodiment of the disclosure.

The following is provided as illustrated in FIG. 4.

The operation C1 may be specifically implemented as follows. When the compressor is executed from on to off: (1) an air volume of the draught fan F is gradually increased, and the air valves G2 and G4 are gradually opened. Part of a flowing amount flows out from G4 without passing through the chamber, the increased air volume of the draught fan is equal to the flowing amount from a bypass where G4 is located, and $\Delta F=\Delta V5$. When G2 is opened and G1 is closed, V3 may be decreased, and when G4 is opened and G3 is closed, V4 may be decreased. The increase of V2 is synchronized with the decrease of V4, and V2+V4=C is kept until G2 is fully opened and V4=0. (2) The flowing amount of the draught fan F is maintained for a certain period of time, and power of the compressor is gradually reduced. (3) The draught fan F is reduced to C, the air valves G1 and G3 are synchronously reduced, and $\Delta F=\Delta V5$. V2+V4=C is kept until the air valves G1 and G3 are closed, and F=V2=C at this time.

Herein, C means that the flowing amount from the heater to the constant temperature chamber is constant and is kept at C.

Figure 5:
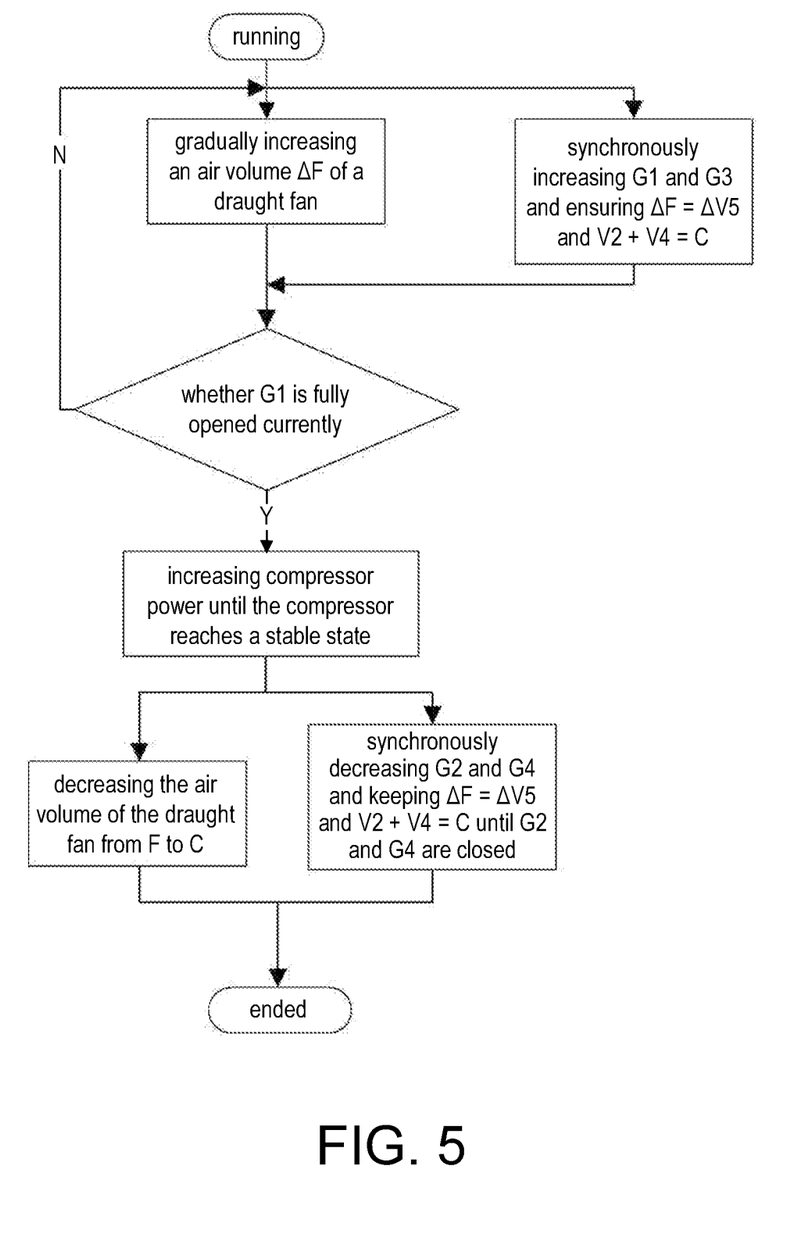
FIG. 5 is a schematic flow chart of operation from turning off the compressor to turning on the draught fan and the air valves according to an embodiment of the disclosure.

The following is provided as illustrated in FIG. 5.

The operation C3 may be specifically implemented as follows. When the compressor is executed from off to on: (1) the air volume of the draught fan F is gradually increased, and the air valve G1 is gradually opened. Since G1 is opened, part of the flowing amount passes through G4 and directly flows out without passing through the chamber, such that the increased air volume of the draught fan is $\Delta F=\Delta V5$. G1 is synchronously increased, V2=C is kept unchanged until G1 is fully opened, and the compressor is turned on. (2) The flowing amount of the draught fan F is maintained for a certain period of time, and the power of the compressor is gradually increased. (3) The air volume of the draught fan is decreased, G2 and G4 are synchronously reduced, G3 begins to be increased, and V4+V2=C and $\Delta F=\Delta V5$ are kept until G4 and G2 are closed, F=V4=C at this time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A temperature air circulation system, comprising: a draught fan, a cooling and heat exchanging device comprising a first air valve (G1), a third wind speed sensor (V3), an evaporator, a compressor, a condenser, and an expansion valve, heaters, a temperature chamber, and bypasses comprising a fourth air valve (G4), a fifth wind speed sensor (V5), a second air valve (G2) and a second wind speed sensor (V2),
  wherein the temperature chamber is not sealed, supplemented gas from a temperature control cabinet is supplied to compensate for gas leaking from the temperature chamber, the draught fan provides power for air to circulate among the temperature control cabinet, the cooling and heat exchanging device, the heaters, the temperature chamber, and the bypasses, the cooling and heat exchanging device cools the circulating air, and the heaters heat the circulating air, such that a temperature of the air circulating in the temperature chamber is stably maintained at a predetermined temperature value,
  wherein when detecting that a temperature of the supplemented gas is continuously lower than a temperature threshold, the bypasses are configured to allow the air processed by the cooling and heat exchanging device to flow without passing through the temperature chamber, to increase an air volume of the draught fan and allow part of the air volume of the draught fan to flow through the temperature chamber without passing through the cooling and heat exchanging device to ensure that a flowing amount of air flowing through the temperature chamber remains stable, and to cause the cooling and heat exchanging device to turn off to stop cooling the circulating air,
  wherein when detecting that the temperature of the supplemented gas is continuously greater than or equal to the temperature threshold, the bypasses are further configured to cause the cooling and heat exchanging device to turn on, to turn off a bypass allowing the air processed by the cooling and heat exchanging device to flow without passing through the temperature chamber, and to turn off a bypass allowing part of the air volume of the draught fan to flow through the temperature chamber without passing through the cooling and heat exchanging device, and to turn on the cooling and heat exchanging device for cooling the circulating air, wherein the bypasses are configured to assist in switching a working state of the cooling and heat exchanging device to save energy in the temperature air circulation system and to ensure that the working state of the cooling and heat exchanging device is switched without affecting a flowing amount and temperature of the gas flowing through the temperature chamber.

2. The temperature air circulation system according to claim 1, wherein the bypasses comprise a first bypass and a second bypass, a gas inlet (GI1) of the first bypass is connected to the gas outlet of the cooling and heat exchanging device, a gas outlet (GO1) of the first bypass is connected to the temperature chamber, a gas inlet (GI2) of the second bypass is connected to the gas outlet of the draught fan, and a gas outlet (GO2) of the second bypass is connected to the gas inlet of the heaters.

3. The temperature air circulation system according to claim 2, wherein when a temperature of the air entering from the temperature control cabinet is detected to be continuously lower than the predetermined temperature threshold, the cooling and heat exchanging device is turned off, the air volume of the draught fan is increased, the first bypass and the second bypass are gradually turned on, and a flowing amount of air flowing through the cooling and heat exchanging device is decreased, such that part of gas processed by the cooling and heat exchanging device flows from the first bypass without passing through the temperature chamber, and such that the increased air volume of the draught fan flows into the heaters from the second bypass to compensate a flowing amount of the gas flowing out of the first bypass, to keep the air volume in the temperature chamber stable,
  wherein when the second bypass is completely turned on, power of a compressor of the cooling and heat exchanging device is decreased, and the air volume of the draught fan is decreased until the cooling and heat exchanging device stops working.

4. The temperature air circulation system according to claim 2, wherein when a temperature of the air entering from the temperature control cabinet is detected to be continuously greater than or equal to the predetermined temperature threshold, the air volume of the draught fan is increased, the cooling and heat exchanging device is turned on, a flowing amount of air flowing to the cooling and heat exchanging device from the draught fan is increased, and a flowing amount of air flowing to the heaters from the cooling and heat exchanging device is increased,
  wherein when the cooling and heat exchanging device is turned on, the air volume of the draught fan is decreased, and the first bypass and the second bypass are turned off.

5. The temperature air circulation system according to claim 3, wherein the temperature air circulation system further comprises: a first wind speed sensor (V1), a third air valve (G3), and a fourth wind speed sensor (V4),
  wherein the first bypass comprises a fourth air valve (G4) and a fifth wind speed sensor (V5), and
  wherein the second bypass comprises a second air valve (G2) and a second wind speed sensor (V2).

6. The temperature air circulation system according to claim 5, wherein one end of the first wind speed sensor (V1) is connected to the gas outlet of the draught fan, another end of the first wind speed sensor (V1) is connected to one end of the first air valve (G1) and one end of the second air valve (G2), another end of the first air valve (G1) is connected to one end of the third wind speed sensor (V3), another end of the third wind speed sensor (V3) is connected to a first end of the evaporator, a second end of the evaporator is connected to one end of the third air valve (G3) and one end of the fourth air valve (G4), another end of the third air valve (G3) is connected to one end of the fourth wind speed sensor (V4), and another end of the fourth wind speed sensor (V4) is connected to the heaters, wherein one end of the first air valve (G1) acts as the gas inlet of the cooling and heat exchanging device, and the second end of the evaporator acts as the gas outlet of the cooling and heat exchanging device,
  wherein a gas inlet of the compressor is connected to a third end of the evaporator, a gas outlet of the compressor is connected to a gas inlet of the condenser, a gas outlet of the condenser is connected to one end of the expansion valve, and another other end of the expansion valve is connected to a fourth end of the evaporator,
  wherein another end of the second air valve (G2) is connected to one end of the second wind speed sensor (V2), and another end of the second wind speed sensor (V2) is connected to another end of the fourth wind speed sensor (V4),
  wherein another end of the fourth air valve (G4) is connected to one end of the fifth wind speed sensor (V5), and another end of the fifth wind speed sensor (V5) is connected to the temperature chamber,
  wherein the first wind speed sensor (V1) is configured to detect the air volume flowing out from the gas outlet of the draught fan, the second wind speed sensor (V2) is configured to detect an air volume of the second bypass, the third wind speed sensor (V3) is configured to detect an air volume flowing into the evaporator, the fourth wind speed sensor (V4) is configured to detect an air volume of air flowing to the heaters from the evaporator, and the fifth wind speed sensor (V5) is configured to detect an air volume of the first bypass.

7. The temperature air circulation system according to claim 6, wherein turning off the cooling and heat exchanging device is specifically implemented as:

increasing the air volume of the draught fan, opening the second air valve (G2) and the fourth air valve (G4) together, and decreasing the air volume of the draught fan and closing the first air valve (G1) and the third air valve (G3) together when the second air valve (G2) is completely opened, wherein opening rates of the second air valve (G2) and the fourth air valve (G4) and closing rates of the first air valve (G1) and the third air valve (G3) are determined based on air volumes detected by the first wind speed sensor (V1), the second wind speed sensor (V2), the third wind speed sensor (V3), the fourth wind speed sensor (V4), and the fifth wind speed sensor (V5), and an increase amount of the air volume of the draught fan is equal to the air volume detected by the fifth wind speed sensor (V5) to ensure that the working state of the cooling and heat exchanging device is switched without affecting the flowing amount and temperature of the gas flowing through the temperature chamber.

8. The temperature air circulation system according to claim 6, wherein turning on the cooling and heat exchanging device is specifically implemented as:

increasing the air volume of the draught fan, opening the first air valve (G1) and the third air valve (G3) together, and gradually decreasing the air volume of the draught fan and closing the second air valve (G2) and the fourth air valve (G4) together when the first air valve (G1) is completely opened, wherein closing rates of the second air valve (G2) and the fourth air valve (G4) and opening rates of the first air valve (G1) and the third air valve (G3) are determined based on the air volumes detected by the first wind speed sensor (V1), the second wind speed sensor (V2), the third wind speed sensor (V3), the fourth wind speed sensor (V4), and the fifth wind speed sensor (V5), and a decrease amount of the air volume of the draught fan is equal to the air volume detected by the fifth wind speed sensor (V5) to ensure that the working state of the cooling and heat exchanging device is switched without affecting the flowing amount and temperature of the gas flowing through the temperature chamber.

9. The temperature air circulation system according to claim 5, wherein the temperature air circulation system further comprises: a first wind speed sensor (V1), a third air valve (G3), and a fourth wind speed sensor (V4), wherein the first bypass comprises a fourth air valve (G4) and a fifth wind speed sensor (V5), and wherein the second bypass comprises a second air valve (G2) and a second wind speed sensor (V2).

10. The temperature air circulation system according to claim 9, wherein one end of the first wind speed sensor (V1) is connected to the gas outlet of the draught fan, another end of the first wind speed sensor (V1) is connected to one end of the first air valve (G1) and one end of the second air valve (G2), another end of the first air valve (G1) is connected to one end of the third wind speed sensor (V3), another end of the third wind speed sensor (V3) is connected to a first end of the evaporator, a second end of the evaporator is connected to one end of the third air valve (G3) and one end of the fourth air valve (G4), another end of the third air valve (G3) is connected to one end of the fourth wind speed sensor (V4), and another end of the fourth wind speed sensor (V4) is connected to the heaters, wherein one end of the first air valve (G1) acts as the gas inlet of the cooling and heat exchanging device, and the second end of the evaporator acts as the gas outlet of the cooling and heat exchanging device, wherein a gas inlet of the compressor is connected to a third end of the evaporator, a gas outlet of the compressor is connected to a gas inlet of the condenser, a gas outlet of the condenser is connected to one end of the expansion valve, and another other end of the expansion valve is connected to a fourth end of the evaporator, wherein another end of the second air valve (G2) is connected to one end of the second wind speed sensor (V2), and another end of the second wind speed sensor (V2) is connected to another end of the fourth wind speed sensor (V4), wherein another end of the fourth air valve (G4) is connected to one end of the fifth wind speed sensor (V5), and another end of the fifth wind speed sensor (V5) is connected to the temperature chamber, wherein the first wind speed sensor (V1) is configured to detect the air volume flowing out from the gas outlet of the draught fan, the second wind speed sensor (V2) is configured to detect an air volume of the second bypass, the third wind speed sensor (V3) is configured to detect an air volume flowing into the evaporator, the fourth wind speed sensor (V4) is configured to detect an air volume of air flowing to the heaters from the evaporator, and the fifth wind speed sensor (V5) is configured to detect an air volume of the first bypass.

11. The temperature air circulation system according to claim 10, wherein turning off the cooling and heat exchanging device is specifically implemented as:

increasing the air volume of the draught fan, opening the second air valve (G2) and the fourth air valve (G4) together, and decreasing the air volume of the draught fan and closing the first air valve (G1) and the third air valve (G3) together when the second air valve (G2) is completely opened, wherein opening rates of the second air valve (G2) and the fourth air valve (G4) and closing rates of the first air valve (G1) and the third air valve (G3) are determined based on air volumes detected by the first wind speed sensor (V1), the second wind speed sensor (V2), the third wind speed sensor (V3), the fourth wind speed sensor (V4), and the fifth wind speed sensor (V5), and an increase amount of the air volume of the draught fan is equal to the air volume detected by the fifth wind speed sensor (V5) to ensure that the working state of the cooling and heat exchanging device is switched without affecting the flowing amount and temperature of the gas flowing through the temperature chamber.

12. The temperature air circulation system according to claim 10, wherein turning on the cooling and heat exchanging device is specifically implemented as:

increasing the air volume of the draught fan, opening the first air valve (G1) and the third air valve (G3) together, and decreasing the air volume of the draught fan and closing the second air valve (G2) and the fourth air valve (G4) together when the first air valve (G1) is completely opened, wherein closing rates of the second air valve (G2) and the fourth air valve (G4) and opening rates of the first air valve (G1) and the third air valve (G3) are determined based on the air volumes detected by the first wind speed sensor (V1), the second wind speed sensor (V2), the third wind speed sensor (V3), the fourth wind speed sensor (V4), and the fifth wind speed sensor (V5), and a decrease amount of the air volume of the draught fan is equal to the air volume detected by the fifth wind speed sensor (V5) to ensure that the working state of the cooling and heat exchanging device is switched without affecting the flowing amount and temperature of the gas flowing through the temperature chamber.

\* \* \* \* \*